(12) United States Patent
Tewari et al.

(10) Patent No.: US 9,531,662 B2
(45) Date of Patent: Dec. 27, 2016

(54) GLOBAL EMAIL IDENTITY PREFERENCES (71) Applicant: Microsoft Technology Licensing, LLC, Redmond, WA (US)

(72) Inventors: Ashutosh Tewari, Fremont, CA (US); Aby John, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 282 days.

(21) Appl. No.: 13/847,942

(22) Filed: Mar. 20, 2013

(65) Prior Publication Data

US 2014/0289339 A1 Sep. 25, 2014

(51) Int. Cl.
G06F 15/16 (2006.01)
H04L 12/58 (2006.01)

(52) U.S. Cl.
CPC .............. H04L 51/36 (2013.01); H04L 51/28 (2013.01)

(58) Field of Classification Search
CPC .......... H04L 51/36; H04L 51/22; H04L 51/28; G06Q 10/107
USPC ........................................................ 709/206
See application file for complete search history.

(56) References Cited

U.S. PATENT DOCUMENTS

| 7,231,428 | B2 * | 6/2007 | Teague ................. G06Q 10/107 709/206 |
| 7,966,377 | B2 * | 6/2011 | Bauchot et al. .............. 709/206 |
| 8,291,030 | B2 | 10/2012 | Smith et al. |
| 2002/0138581 | A1 * | 9/2002 | MacIntosh et al. .......... 709/206 |
| 2007/0260693 | A1 | 11/2007 | Cardone et al. |
| 2008/0052364 | A1 * | 2/2008 | Zhou .............................. 709/206 |
| 2008/0133680 | A1 * | 6/2008 | Kodama ....................... 709/206 |
| 2011/0179149 | A1 | 7/2011 | Kazan et al. |
| 2011/0246593 | A1 | 10/2011 | Crespo et al. |
| 2012/0311057 | A1 | 12/2012 | Wang |

FOREIGN PATENT DOCUMENTS

EP 2053521 A1 4/2009

OTHER PUBLICATIONS

"Enable "Send Mail As" Feature", Retrieved from <http://itservices.stanford.edu/service/googleapps/emailcalendar/mobile/ios_sendmail>on Feb. 25, 2013, (Feb. 11, 2013), 3 pages.

(Continued)

Primary Examiner — Esther B Henderson
(74) Attorney, Agent, or Firm — Anand Gupta; Geraldine R. McMiller; Micky Minhas (57) ABSTRACT In embodiments of global email identity preferences, a default outgoing email address that is designated by a user is maintained at an email server. The user can also be associated with multiple email addresses that are correlated at the email server. When an outgoing email is received at the email server for delivery to a designated recipient, the outgoing email can be identified as being from one of the multiple email addresses that are associated with the user. A determination is made as to whether to update the outgoing email with the default outgoing email address that is associated with the user, such as if the outgoing email is received from an email client that does not allow user selection of a default client email address. The outgoing email is then routed to the designated recipient for display as being from the default outgoing email address.

20 Claims, 4 Drawing Sheets

(56) References Cited

OTHER PUBLICATIONS

"iCloud: Create or Change Email Aliases", Retrieved from <http://support.apple.com/kb/ph2622> on Feb. 25, 2013, (Jan. 17, 2013), 2 pages.
Erlich, Alicia "Quick Tip: How to Change the Default Email and Calendar on Your Blackberry", Retrieved from <http://crackberry.com/quick-tip-how-change-default-email-and-calendar-your-blackberry> on Feb. 25, 2013, (Sep. 2, 2011), 5 pages.
Pot, Ronny "How to Send from an Email Address Alias?", Retrieved from <http://blog.ronnypot.nl/?p=801> on Feb. 25, 2013, (May 30, 2011), 7 pages.
Schechter, Michael "Handling Multiple Email Addresses with Gmail and iOS", Retrieved from <http://bettermess.com/handling-multiple-email-addresses-with-gmail-and-ios/> on Feb. 25, 2013, (Sep. 20, 2012), 3 pages.
Tschabitscher, Heinz "How to Set the Default Account in Outlook", Retrieved from <http://email.about.com/od/outlooktips/qt/How_to_Set_the_Default_Account_in_Outlook.htm>on Feb. 25, 2013, (2013), 1 page.
"International Search Report and Written Opinion", Application No. PCT/US2014/031146, Jun. 3, 2015, 9 pages.
Supplementary Search Report Issued in European Patent Application No. 14720853.2, Mailed Date: Oct. 20, 2016, 8 Pages.

\* cited by examiner

GLOBAL EMAIL IDENTITY PREFERENCES

BACKGROUND

Many types of devices can be used to access, read, generate, and/or send email messages, such as with computing devices, mobile phones, and/or tablet devices. It is also common for a user to have multiple email accounts, and the user can access the multiple email accounts with various user devices that facilitate using email applications, such as on a device and/or with Web-based email clients via a browser application. When a user drafts emails at a user device to send out, the user may have to manually select or designate an outgoing email address from the multiple email addresses that are associated with the user before sending each email. Alternatively, the user device may lack the functionality that would otherwise allow the user to manually select an outgoing email address. Typically, a user may prefer that most or all of his or her emails appear to be sent from the same outgoing email address. However, the extra and manual step of selecting an outgoing email address each time may be skipped or forgotten, causing emails to appear as having been sent from email addresses that the user would otherwise not want disclosed to recipients of the email messages.

SUMMARY

This Summary introduces features and concepts of global email identity preferences, which is further described below in the Detailed Description and/or shown in the Figures. This Summary should not be considered to describe essential features of the claimed subject matter, nor used to determine or limit the scope of the claimed subject matter.

Global email identity preferences is described. In embodiments, a default outgoing email address that is designated by a user is maintained at an email server. The user can also be associated with multiple email addresses that are correlated at the email server. When an outgoing email is received at the email server for delivery to a designated recipient, the outgoing email can be identified as being from one of the multiple email addresses that are associated with the user. A determination is made as to whether to update the outgoing email with the default outgoing email address that is associated with the user, such as if the outgoing email is received from an email client that does not allow user selection of a default client email address. The outgoing email is then routed to the designated recipient for display as being from the default outgoing email address.

In implementations, the determination as to whether to update the outgoing email with the default outgoing email address may be to not update the outgoing email, such as if the outgoing email is received from an email client that is configured to allow user selection of a default client email address. The outgoing email can then be routed to the designated recipient without the update, and for display at a recipient device as being from any one of the multiple email addresses that are associated with the user.

In implementations, a determination as to whether to update the outgoing email address of an outgoing email may also be based on whether the outgoing email is received as an original email, a reply email, or a forwarded email. For example, an outgoing email can be updated with the default outgoing email address that is associated with the user if the outgoing email is the original email. The outgoing email may also be routed to the designated recipient without the address update if the outgoing email is a reply email. Alternatively, a reply email may also be updated with the default outgoing email address, or with a different outgoing email address. In implementations, a forwarded email from the user can be handled as an original email with the address update of the default outgoing email address, or may be handled as a reply email and routed without the address update of the default outgoing email address.

BRIEF DESCRIPTION OF THE DRAWINGS

Embodiments of global email identity preferences are described with reference to the following Figures. The same numbers may be used throughout to reference like features and components that are shown in the Figures.

DETAILED DESCRIPTION

Embodiments of global email identity preferences are described and may be implemented by any type of device or system that supports receiving, routing, storing, and distributing emails, such as an email server system. For a user who has multiple email accounts, the email server system can correlate the various, different email addresses that are associated with the user, such as different email addresses that are on the same service and/or from different services. For example, an email hosting service may allow a user more than one email address for the same email account, which can be setup as different email addresses for the same email account or as multiple email accounts that are linked or otherwise correlated at the email hosting service. Further, the email hosting service may allow a user to designate additional email addresses from other email services that are correlated together at the email server system.

In embodiments, the user can designate one of the multiple email addresses that are associated with the user at the email server system as a default outgoing email address. An email service implemented at the email server system can then receive outgoing emails from various email clients (e.g., email applications and/or devices) for distribution to designated email recipients, and update the outgoing email address of the outgoing emails to the default outgoing email address for the user. A delivered email can then be displayed at a recipient client device, and the email will display as being from the default outgoing email address that has been designated by the user who sent the email. This alleviates not having the option to choose an outgoing email address, or the user having to manually select an outgoing email address each time the user generates and sends an email message. This also prevents emails from the user appearing as having been sent from email addresses that the user would otherwise not want disclosed to recipients of the email messages.

While features and concepts of global email identity preferences can be implemented in any number of different devices, systems, networks, environments, and/or configurations, embodiments of global email identity preferences are described in the context of the following example devices, systems, and methods.

Figure 1:
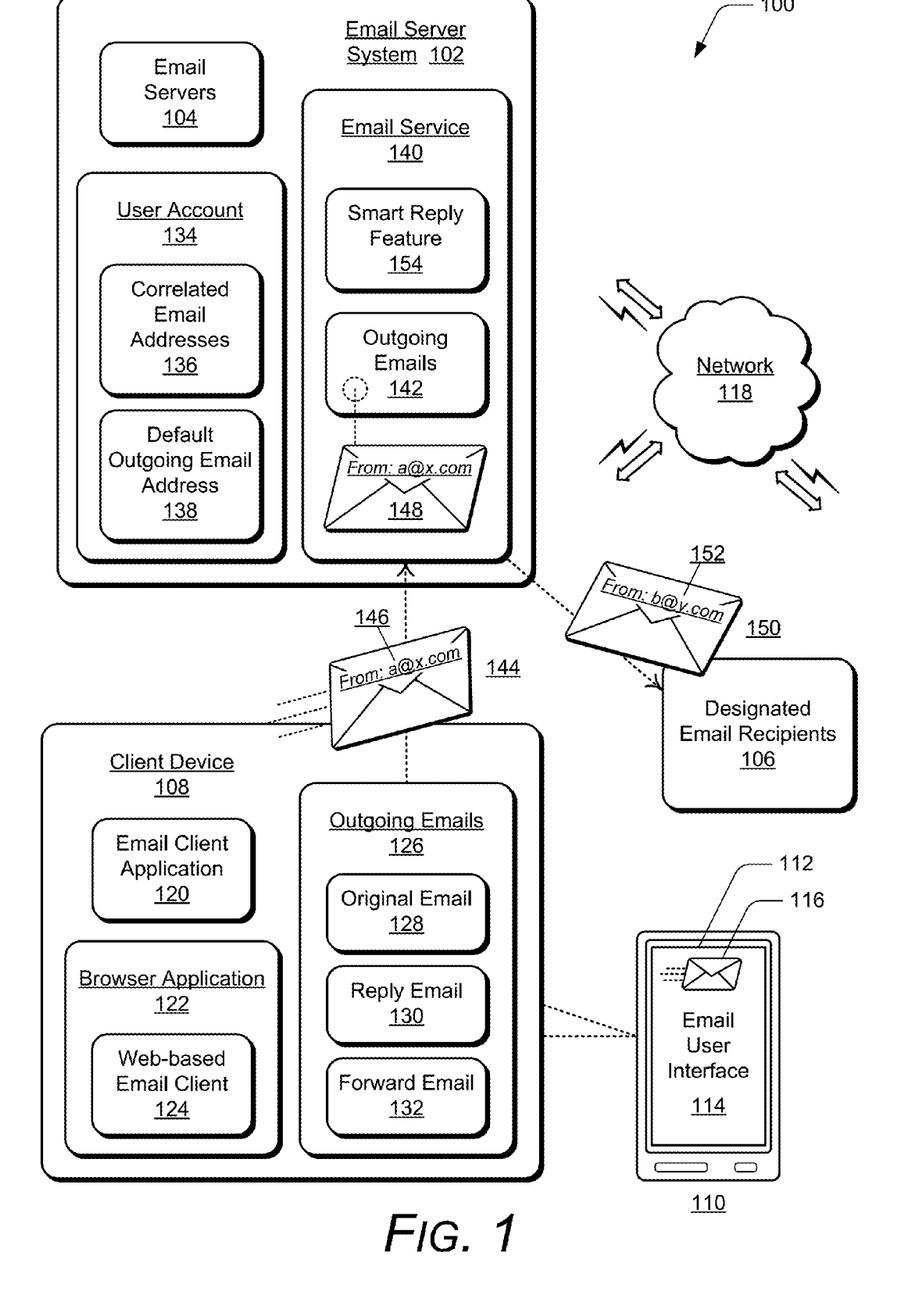
FIG. 1 illustrates an example system in which embodiments of global email identity preferences can be implemented.

FIG. 1 illustrates an example system 100 in which embodiments of global email identity preferences can be implemented. The system 100 includes an email server system 102 with email servers 104 that receive email messages for routing and distribution to designated email recipients 106 of the email messages. The email server system 102 is representative of a Web-based email hosting service (also referred to as cloud-based, or "in the cloud"), an enterprise or company-wide email system, or any other type of networked email server system that receives, routes, stores, and/or distributes email messages.

The example system 100 also includes an example client device 108 that may be any one or combination of a wired or wireless device, such as a mobile phone, tablet, computing, communication, entertainment, gaming, media playback, and/or other type of device that a user may use to access, read, generate, and/or send emails. For example, a mobile phone 110 includes an integrated display device 112 on which an email application user interface 114 can be displayed to facilitate a user accessing, reading, generating, and/or sending emails 116, such as when addressed to the designated email recipients 106. Any of the devices described herein, such as the email servers 104 of the email server system 102, the client device 108, and devices associated with the email recipients that receive emails, can be implemented with various components, such as a processing system and memory, as well as any number and combination of differing components as further described with reference to the example device shown in FIG. 4.

Any of the devices and servers described herein can communicate via a network 118, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

The client device 108 can include an email client application 120 and/or a browser application 122 that supports a Web-based email client 124. The email client application and/or the Web-based email client (e.g., both commonly referred to herein as an email client) are implemented to facilitate a user accessing, reading, generating, and/or sending emails. For example, a user of the client device 108 can compose, or generate, email messages that are sent out as outgoing emails 126 through interaction with the email client application 120 and/or the Web-based email client 124. The email user interface 114 shown on the mobile phone 110 is an example user interface of the email client application 120 or the Web-based email client 124 (e.g., displayed within a user interface of the browser application). As used herein, an email client may also refer to any type of email application or device that supports an email application and/or email functions.

In this example, the types of outgoing emails 126 that a user may generate include original emails 128, reply emails 130, and/or forwarded emails 132. For example, an original email 128 is a new email that the user drafts or composes with a message, addresses to selected designated recipients, and initiates sending to the designated recipients. The user can initiate the email client application 120 and/or the Web-based email client 124 to generate a new email, such as in the email user interface 114. The user may also generate a reply email 130, such as when the user replies to an email message that was previously received at the client device 108 and accessed by the user. Similarly, the user may generate a forward email 132, such as when the user receives an email message at the client device 108, selects other recipients to receive the email message, and forwards the email message to the other designated recipients.

As described above, the email client application 120, the Web-based email client 124, or the client device 108 itself, may or may not be configured to allow the user of the device to select a default client email address for any of the different types of outgoing emails 126, such as if the user has multiple email accounts (e.g., with different corresponding email addresses). Typically, for each email that the user generates to send out at the client device 108, the user would have to manually select or designate an outgoing email address from the multiple email addresses that are associated with the user before sending each email.

The email server system 102 can be implemented to maintain a user account 134, such as for the user of the client device 108, to relate the multiple different email addresses that are associated with the user as the correlated email addresses 136. For example, the email server system 102 can correlate the various, different email addresses that are on the same service and/or from different email services. Additionally, the user account 134 includes a default outgoing email address 138, such as may be designated by the user who is associated with the multiple email addresses that are correlated at the email server system. Although only one user account 134 is described and shown, the email server system 102 can be implemented to maintain any number of user accounts for respective users who have multiple email accounts and are associated with multiple email addresses.

The email server system 102 also includes an email service 140 that can be implemented as a software application (e.g., executable instructions) stored on computer-readable storage media, such as any suitable memory device or electronic data storage. The email server system 102 can be implemented with computer-readable storage media as described with reference to the example device shown in FIG. 4. Additionally, the email service can be executed with a processing system at the email server system to implement embodiments of global email identity preferences as described herein.

The email service 140 at the email server system 102 is implemented to receive outgoing emails 142 from different email clients for delivery to designated recipients, such as an outgoing email 126 that is received from client device 108 when sent by the user of the device for delivery to one or more of the designated email recipients 106. The outgoing emails 142 can be identified as being from different ones of the multiple email addresses that are associated with the user. In this example, the correlated email addresses 136 that are maintained at the email server system include the email addresses "user@x.com", "a@x.com", and "b@y.com" that are all associated with the user of the client device 108. The user can generate an outgoing email 144 with the outgoing email address "a@x.com" 146 that is sent from the client device 108 and routed to the email server system 102 via the network 118 for delivery to one or more designated email recipients 106. The outgoing email 144 from the client device is received at the email server system as the outgoing email 148 that is to be routed for delivery to the designated email recipients.

In implementations, the email service 140 can update the outgoing email address "a@x.com" 146 with the default outgoing email address 138 that is associated with the user, such as the address "b@y.com". The outgoing email can then be routed to a designated recipient 106 as the outgoing email 150 with the default outgoing email address "b@y.com" 152. The email can then be displayed at a recipient client device, and the email will display as being from the default outgoing email address of the user who sent the email. Additionally, the email service 140 can be implemented to first determine whether an outgoing email 142 is received from an email client that allows user selection of a default client email address.

For example, the email server system 102 can maintain a list of email clients (e.g., email applications and/or devices) that allow a user to select a default client email address for an outgoing email, and/or maintain a list of the email clients that do not allow a user to select a default client email address. The type of email client that sends an outgoing email can be determined from the outgoing email that is received for routing and delivery to a designated email recipient. The email service 140 can then update an outgoing email 142 with the default outgoing email address 138 if the outgoing email is received from an email client that does not allow user selection of a default client email address. Alternatively, the email service 140 can route an outgoing email 142 to a designated recipient 106 without an update of the outgoing email address if the outgoing email is received from an email client that is configured to allow user selection of a default client email address. In this instance, the user may have already designated the outgoing email address at the email client, in which case, the outgoing email address is not changed by the email service.

In embodiments, the email service 140 implements a smart reply feature 154 to determine whether to update an outgoing email address based on whether an outgoing email 142 is received as an original email 128, a reply email 130, or a forwarded email 132, collectively the different types of outgoing emails 126 received from the client device 108. For example, if the user receives an email message that is directed to a particular email address of the user, he or she may want to reply from the same outgoing email address, rather than having the reply outgoing email address changed by the email service 140 to the default outgoing email address 138 when the reply email is routed via the email server system.

The email service 140 can determine whether an outgoing email 142 is an original email 128, a reply email 130, or a forwarded email 132 based on the type of server call to the email server system (e.g., server calls may be structured differently for the different types of outgoing emails). Alternatively or in addition, the email service 140 may determine whether an outgoing email 142 is an original, reply, or forwarded email from the subject line of the outgoing email, from message content of the outgoing email, and/or from other email data and content.

In embodiments, the email service 140 can determine that an outgoing email 142 is received as an original email 128, such as a new email that the user generates, addresses, and sends out. The email service can then update the outgoing email with the default outgoing email address 138 that is associated with the user if the outgoing email is an original email. The email service 140 can also determine that an outgoing email 142 is received as a reply email 130, such as when the user replies to an email message that was previously received. The email service can then route the outgoing email to a designated recipient 106 without updating the outgoing email address if the outgoing email is a reply email.

Alternatively, a reply email may also be updated with the default outgoing email address, or with a different outgoing email address. For example, as described above, a user has a primary email account at the address "user@x.com", and has two associated aliases "a@x.com" and "b@y.com" that are all correlated at the email server system 102. The user may also designate the default outgoing email address as "b@y.com". Someone may send an email to the user at "a@x.com" and the user receives the email on the mobile phone 110, which is set up with the primary email address "user@x.com". When the user replies to the email from the mobile phone, the device sets the outgoing email address (e.g., the FROM address) to the primary email address "user@x.com". Then when the email server system 102 receives the outgoing email from the client device 108, the email service 140 can determine whether to update the outgoing email address "user@x.com" to the default outgoing email address "b@y.com"; route the outgoing email with the current, primary email address "user@x.com" (e.g., without an update); or correct the outgoing email address to "a@x.com", which is the original email address that the email was sent to by the sender of the email. In embodiments, these determinations by the email service 140 can be based on policy decisions, as designated by the smart reply feature 154.

Additionally, the email service 140 can determine that an outgoing email 142 is received as a forwarded email 132, such as when a user receives an email message, selects other recipients to receive the email message, and forwards the email message to the other designated recipients. The email service 140 is implemented to then determine whether the forwarded email is to be handled and routed as an original email with the address update of the default outgoing email address, or is to be handled as a reply email and routed without the address update of the default outgoing email address. A forwarded email can be handled and routed as an original email or as a reply email based on user designation, a default decision of the email service, or based on any other device and/or application setting.

Example methods 200 and 300 are described with reference to respective FIGS. 2 and 3 in accordance with one or more embodiments of global email identity preferences. Generally, any of the services, components, modules, methods, and operations described herein can be implemented using software, firmware, hardware (e.g., fixed logic circuitry), manual processing, or any combination thereof. The example methods may be described in the general context of executable instructions stored on computer-readable storage media that is local and/or remote to a computer processing system, and implementations can include software applications, programs, functions, and the like.

Figure 2:
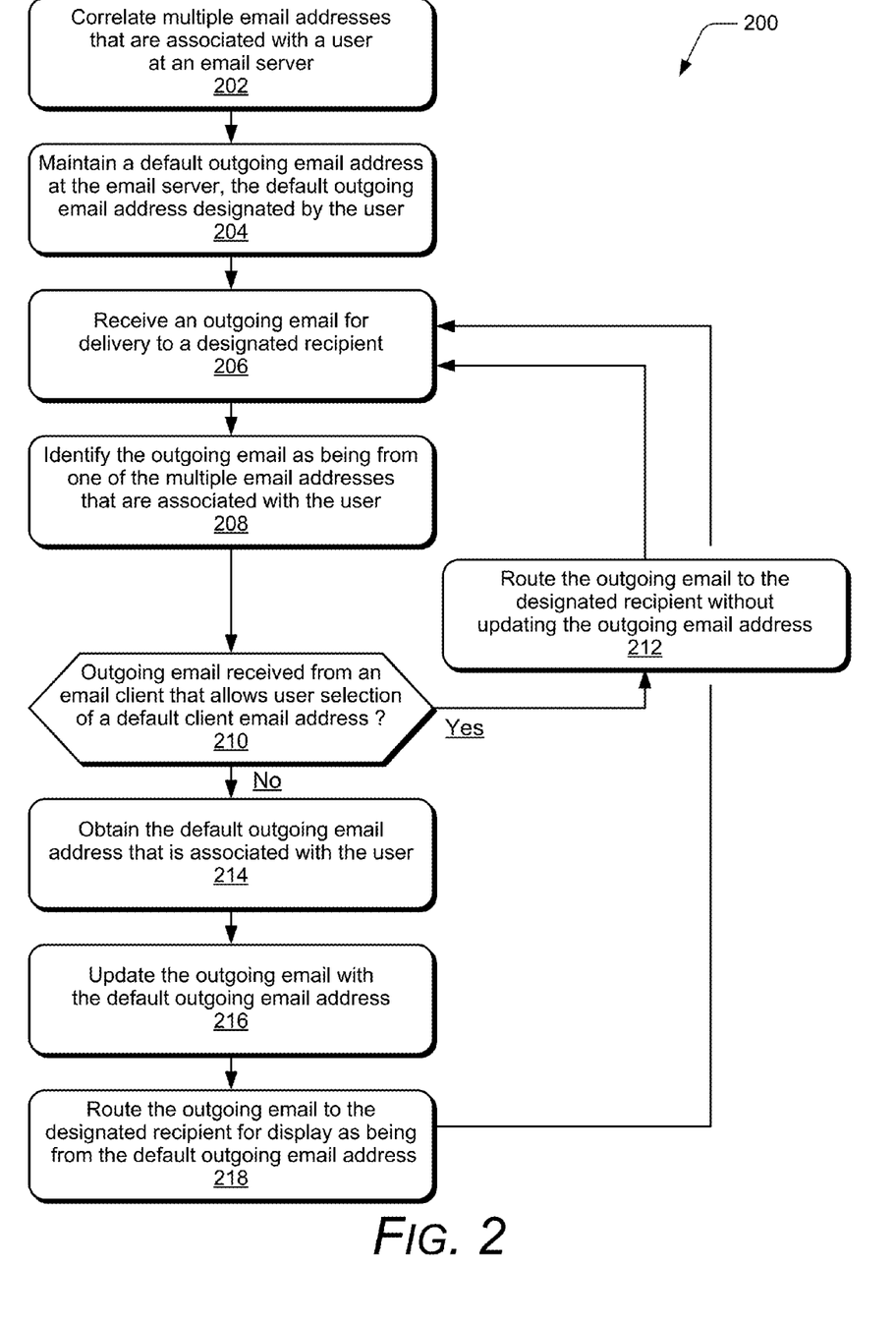
FIG. 2 illustrates example method(s) of global email identity preferences in accordance with one or more embodiments.

FIG. 2 illustrates example method(s) 200 of global email identity preferences, and is generally described with reference to an email service. The order in which the method is described is not intended to be construed as a limitation, and any number or combination of the method operations can be performed in any order to implement a method, or an alternate method.

At 202, multiple email addresses that are associated with a user are correlated at an email server. For example, the email service 140 at the email server system 102 (FIG. 1) correlates the multiple email addresses 136 that are associated with a user, such as in the user account 134 for a person that has several email accounts. The email server system 102 can correlate various, different email addresses 136 that are on the same service and/or from different services.

At 204, a default outgoing email address is maintained at the email server, where the default outgoing email address is designated by the user. For example, the email server system 102 maintains the default outgoing email address 138 that the user has designated from the multiple email addresses 136, which are correlated at the email server system.

At 206, an outgoing email is received for delivery to a designated recipient and, at 208, the outgoing email is identified as being from one of the multiple email addresses that are associated with the user. For example, the email service 140 receives the outgoing emails 142 from various client devices for delivery to respective designated email recipients 106, and the email service identifies an outgoing email 148 as being from one of the multiple email addresses 136 that are associated with the user. In the example described with reference to FIG. 1, two of the correlated email addresses 136 that are maintained at the email server system include the email addresses "a@x.com" and "b@y.com" that are associated with the user of the client device 108. The user can generate an outgoing email 144 with the outgoing email address "a@x.com" 146 that is sent from the client device 108 and routed to the email server system 102 for delivery to one or more of the designated email recipients 106. The outgoing email 144 from the client device is received at the email server system as the outgoing email 148.

At 210, a determination is made as to whether the outgoing email is received from an email client that allows user selection of a default client email address. For example, the email service 140 determines whether the outgoing email 148 is received (at 206) from an email client that allows user selection of a default client email address. For example, some types of email clients (e.g., email applications and/or devices) may allow a user to select a default client email address for an outgoing email, while other email clients do not.

If the email client from which the outgoing email is received does allow user selection of a default client email address (i.e., "yes" from 210), then at 212, the outgoing email is routed to the designated recipient without updating the outgoing email address. For example, the email service 140 does not update the outgoing email address 146 of the outgoing email 148 to the default outgoing email address 138 if the email client from which the outgoing email is received does allow user selection of a default client email address. In this instance, the user may have already designated the outgoing email address at the email client, in which case, the outgoing email address is not changed by the email service. The method can then continue at 206 to receive another outgoing email for delivery to a designated email recipient.

If the email client from which the outgoing email is received does not allow user selection of a default client email address (i.e., "no" from 210), then at 214, the default outgoing email address that is associated with the user is obtained and, at 216, the outgoing email is updated with the default outgoing email address. For example, the email service 140 obtains the user-designated default outgoing email address 138 (e.g., maintained at the email server system at 204), and updates the outgoing email 148 with the default outgoing email address. In the example described above, the email service 140 can update the outgoing email address "a@x.com" 146 with the default outgoing email address 138 that is associated with the user, such as to a default address "b@y.com".

At 218, the outgoing email is routed to the designated recipient for display as being from the default outgoing email address. For example, the email service 140 routes the outgoing email 150 to a designated email recipient 106 with the default outgoing email address "b@y.com" 152, and the email can be displayed at a recipient client device as being from the default outgoing email address of the user who sent the email. The method can then continue at 206 to receive another outgoing email for delivery to a designated recipient.

Figure 3:
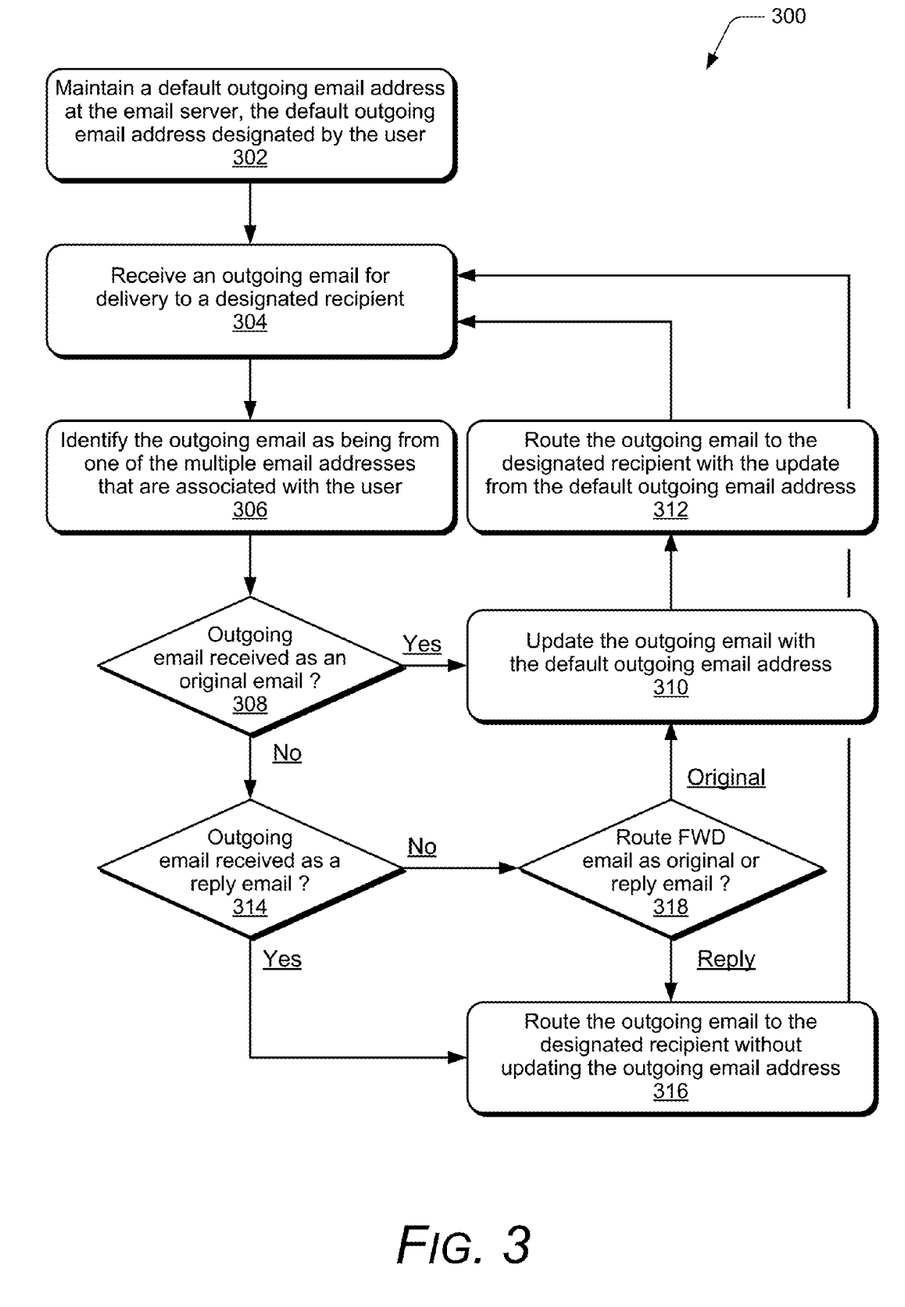
FIG. 3 illustrates example method(s) of global email identity preferences in accordance with one or more embodiments.

FIG. 3 illustrates example method(s) 300 of global email identity preferences, and is generally described with reference to an email service. The order in which the method is described is not intended to be construed as a limitation, and any number or combination of the method operations can be performed in any order to implement a method, or an alternate method.

At 302, a default outgoing email address is maintained at an email server, where the default outgoing email address is designated by a user. For example, the email server system 102 (FIG. 1) maintains the default outgoing email address 138 that the user has designated from the multiple email addresses 136, which are correlated at the email server system.

At 304, an outgoing email is received for delivery to a designated recipient and, at 306, the outgoing email is identified as being from one of the multiple email addresses that are associated with the user. For example, the email service 140 receives the outgoing emails 142 from various client devices for delivery to respective designated email recipients 106, and the email service identifies an outgoing email 148 as being from one of the multiple email addresses 136 that are associated with the user. In the example described with reference to FIG. 1, two of the correlated email addresses 136 that are maintained at the email server system include the email addresses "a@x.com" and "b@y.com" that are associated with the user of the client device 108. The user can generate an outgoing email 144 with the outgoing email address "a@x.com" 146 that is sent from the client device 108 and routed to the email server system 102 for delivery to one or more of the designated email recipients 106. The outgoing email 144 from the client device is received at the email server system as the outgoing email 148.

At 308, a determination is made as to whether the outgoing email is received as an original email. For example, the email service 140 determines whether the outgoing email 148 received at 304 is an original email 128, such as a new email that the user of the client device 108 generates, addresses, and sends out. As noted above, the email service 140 can determine the type of outgoing email 142 based on the structure of the server call to the email server system 102, or in other instances, from the subject line of the outgoing email, from message content of the outgoing email, and/or from other email data and content.

If the outgoing email is received as an original email (i.e., "yes" from 308), then at 310, the outgoing email is updated with the default outgoing email address that is associated with the user and, at 312, the outgoing email is routed to the designated recipient with the update of the default outgoing email address. For example, the email service 140 updates the outgoing email address "a@x.com" 146 of the outgoing email 148 with the default outgoing email address 138 that is associated with the user and maintained at the email server, such as the default outgoing email address "b@y.com" 152. The email service 140 then routes the outgoing email 150 to the designated email recipient 106 where the email can be displayed at a recipient client device as being from the default outgoing email address of the user who sent the email. The method can then continue at 304 to receive another outgoing email for delivery to a designated recipient.

If the outgoing email is not received as an original email (i.e., "no" from 308), then at 314, a determination is made as to whether the outgoing email is received as a reply email. For example, the email service 140 determines whether the outgoing email 148 received at 304 is a reply email 130, such as when a user replies to an email message that was previously received at the client device 108 and accessed by the user.

If the outgoing email is received as a reply email (i.e., "yes" from 314), then at 316, the outgoing email is routed to the designated recipient without updating the outgoing email address. For example, the email service 140 does not update the outgoing email address 146 of the outgoing email 148 to the default outgoing email address 138 if the outgoing email is received as a reply email 130. In this instance, the outgoing reply email is routed to the designated email recipient 106 with the same outgoing email address that corresponds to the particular email address of the user at which the email message was received.

Alternatively, a reply email may be updated with the default outgoing email address, or with a different outgoing email address as described in the example above. For example, a user may access a received email on a mobile device and initiate a reply to the received email. The mobile device may then change the outgoing email address of the reply email, such as to a primary account email address. The email service 140 may then receive the outgoing reply email and update the outgoing email address with the default outgoing email address 138. Alternatively, the email service can correct the outgoing email address (e.g., the FROM address) to reflect the original email address that the email was sent to by a sender of the email. The method can then continue at 304 to receive another outgoing email for delivery to a designated recipient.

If the outgoing email is not received as a reply email (i.e., "no" from 314), then at 318, the outgoing email is a forwarded email (e.g., not an original or reply email) and a determination is made as to whether the forwarded email is to be routed as an original email or as a reply email. For example, if the outgoing email 148 is not received as an original email 128 or as a reply email 130, then the email service 140 receives the outgoing email at 304 as a forwarded email 132, such as when a user receives an email message, selects other recipients to receive the email message, and forwards the email message to the other designated recipients.

If the forwarded email (e.g., outgoing email) is to be routed as an original email (i.e., "original" from 318), then as described above at 310, the outgoing email is updated with the default outgoing email address that is associated with the user and, at 312, the outgoing email is routed to the designated recipient with the update of the default outgoing email address. If the outgoing email is to be routed as a reply email (i.e., "reply" from), then as described above at 316, the outgoing email is routed to the designated recipient without updating the outgoing email address. The method can then continue at 304 to receive another outgoing email for delivery to a designated recipient.

Figure 4:
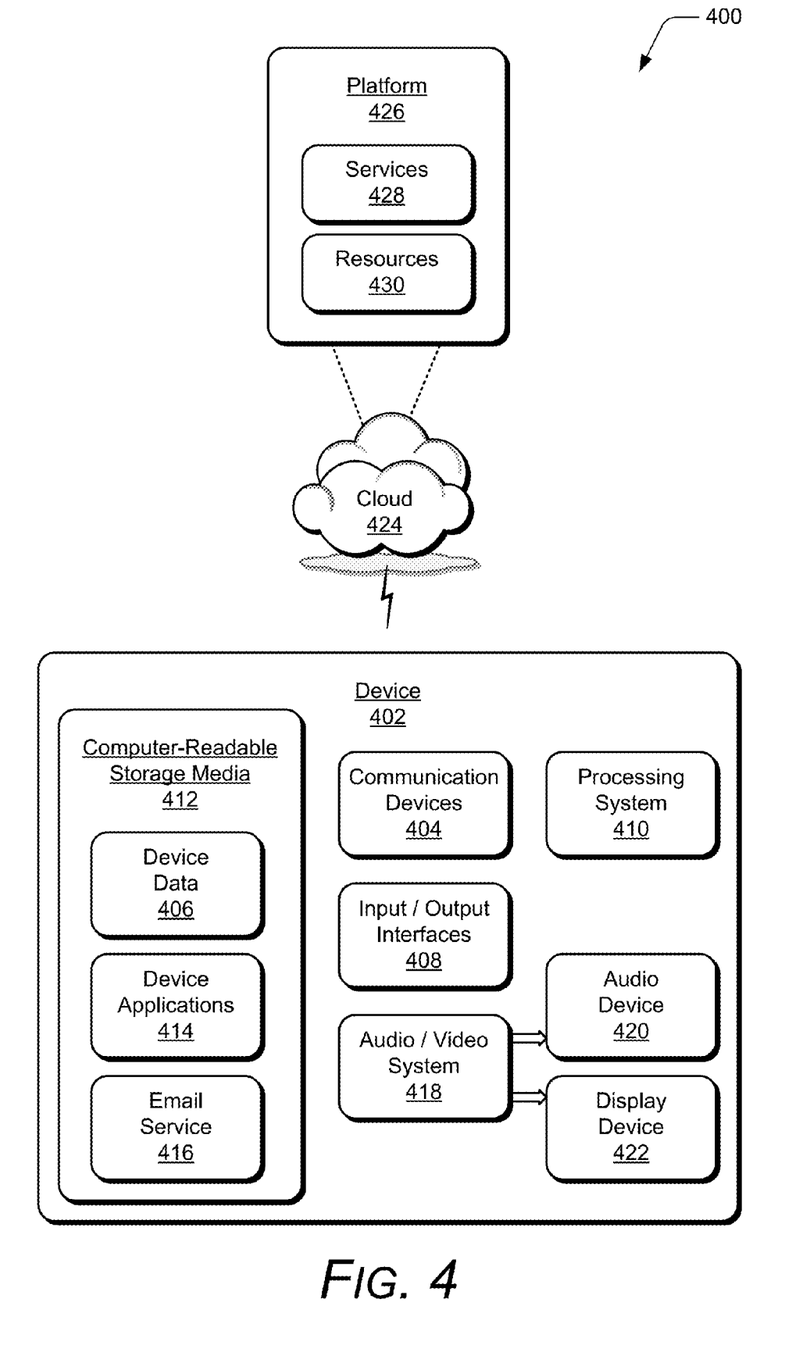
FIG. 4 illustrates an example system with an example device that can implement embodiments of global email identity preferences.

FIG. 4 illustrates an example system 400 that includes an example device 402, which can implement embodiments of global email identity preferences. The example device 402 can be implemented as any of the devices and/or servers described with reference to the previous FIGS. 1-3, such as any type of client device, mobile phone, tablet, computing, communication, entertainment, gaming, media playback, and/or other type of device. For example, the email server system 102, an email server 104, and/or the client devices 108, 110 shown in FIG. 1 may be implemented as the example device 402.

The device 402 includes communication devices 404 that enable wired and/or wireless communication of device data 406, such as email messages that are received, routed, stored, and/or delivered as the outgoing emails. Additionally, the device data can include any type of audio, video, and/or image data. The communication devices 404 can also include transceivers for cellular phone communication and for network data communication.

The device 402 also includes input/output (I/O) interfaces 408, such as data network interfaces that provide connection and/or communication links between the device, data networks, and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The device 402 includes a processing system 410 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 402 may further include any type of a system bus or other data and command transfer system that couples the various components within the device. A system bus can include any one or combination of different bus structures and architectures, as well as control and data lines.

The device 402 also includes computer-readable storage media 412, such as data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

The computer-readable storage media 412 provides storage of the device data 406 and various device applications 414, such as an operating system that is maintained as a software application with the computer-readable storage media and executed by the processing system 410. In this example, the device applications also include an email service 416 that implements embodiments of global email identity preferences, such as when the example device 402 is implemented as the email server system 102 shown in FIG. 1. An example of the email service 416 is the email service 140 of the email server system 102, as described with reference to FIGS. 1-3.

The device 402 also includes an audio and/or video system 418 that generates audio data for an audio device 420 and/or generates display data for a display device 422. The audio device and/or the display device include any devices that process, display, and/or otherwise render audio, video, display, and/or image data. In implementations, the audio device and/or the display device are integrated components of the example device 402. Alternatively, the audio device and/or the display device are external, peripheral components to the example device.

In embodiments, at least part of the techniques described for global email identity preferences may be implemented in a distributed system, such as over a "cloud" 424 in a platform 426. The cloud 424 includes and/or is representative of the platform 426 for services 428 and/or resources 430. For example, the services 428 may include any of the email service 140, the email server system 102, and the email servers 104 described with reference to FIG. 1. Additionally, the resources 430 may also include the email service 140, as well as any of the email messages and data described with reference to FIG. 1.

The platform 426 abstracts underlying functionality of hardware, such as server devices (e.g., included in the services 428) and/or software resources (e.g., included as the resources 430), and connects the example device 402 with other devices, servers, etc. The resources 430 may also include applications and/or data that can be utilized while computer processing is executed on servers that are remote from the example device 402. Additionally, the services 428 and/or the resources 430 may facilitate subscriber network services, such as over the Internet, a cellular network, or Wi-Fi network. The platform 426 may also serve to abstract and scale resources to service a demand for the resources 430 that are implemented via the platform, such as in an interconnected device embodiment with functionality distributed throughout the system 400. For example, the functionality may be implemented in part at the example device 402 as well as via the platform 426 that abstracts the functionality of the cloud 424.

Although embodiments of global email identity preferences have been described in language specific to features and/or methods, the appended claims are not necessarily limited to the specific features or methods described. Rather, the specific features and methods are disclosed as example implementations of global email identity preferences.

The invention claimed is:

1. A method, comprising:
maintaining a default outgoing email address at an email server, the default outgoing email address designated by a user who is associated with multiple email addresses that are correlated at the email server;
maintaining, at the email server, a list of email clients that allow or do not allow the user to select the default outgoing email address for an outgoing email;
receiving the outgoing email for delivery to a designated recipient, the outgoing email received from an email client and the outgoing email identified as being from an initial outgoing email address;
determining whether to update the outgoing email with the default outgoing email address that is associated with the user based at least in part on the list of email clients; and
routing the outgoing email to the designated recipient for display.

2. A method as recited in claim 1, further comprising:
determining that the initial outgoing email address is one of the multiple email addresses associated with the user; and
updating the outgoing email with the default outgoing email address.

3. A method as recited in claim 2, wherein the outgoing email is routed to the designated recipient for display as being from the default outgoing email address.

4. A method as recited in claim 1, wherein determining whether to update the outgoing email with the default outgoing email address comprises:
updating the outgoing email with the default outgoing email address that is associated with the user if the outgoing email is received from a different email client that does not allow user selection of the default client email address.

5. A method as recited in claim 1, wherein determining whether to update the outgoing email with the default outgoing email address comprises:
determining that the outgoing email is received from the email client that is in the list of email clients that allows user selection of a default client email address; and
said routing the outgoing email to the designated recipient without the update for display as being from the initial outgoing email address.

6. A method as recited in claim 1, wherein determining whether to update the outgoing email comprises:
determining whether the outgoing email is received as an original email; and
updating the outgoing email with the default outgoing email address that is associated with the user if the outgoing email is the original email.

7. A method as recited in claim 6, wherein determining whether to update the outgoing email comprises:
determining whether the outgoing email is received as a reply email, wherein the reply email is one of:
updated with the default outgoing email address;
routed without an update of the outgoing email address; or
updated with an original email address that was used by a sender to communicate an email to the user.

8. A method as recited in claim 7, wherein determining whether to update the outgoing email comprises:
determining whether the outgoing email is received as a forwarded email; and
routing the forwarded email with the update of the default outgoing email address; or
routing the forwarded email without the update of the default outgoing email address.

9. A method as recited in claim 8, wherein the outgoing email is determined as the original email, the reply email, or the forwarded email based on at least one of a subject of the outgoing email, message content of the outgoing email, or a structure of a server call to the outgoing email.

10. An email server system, comprising:
a memory device configured to maintain a default outgoing email address designated by a user who is associated with multiple email addresses and maintain a list of email clients that allow or do not allow the user to select the default outgoing email address for outgoing emails;
a processing system to implement an email service that is configured to:
receive the outgoing emails from different email clients for delivery to designated recipients, the outgoing emails identified as being from different ones of the multiple email addresses that are associated with the user; and update one or more of the outgoing emails with the default outgoing email address that is associated with the user based on the list of email clients.

11. An email server system as recited in claim 10, wherein the email service is configured to route the one or more outgoing emails to respective ones of the designated recipients for display as being from the default outgoing email address.

12. An email server system as recited in claim 10, wherein the email service is configured to:

correlate the multiple email addresses that are associated with the user; and receive the user designation of the default outgoing email address from an email client that corresponds to the user.

13. An email server system as recited in claim 10, wherein the email service is configured to update an outgoing email with the default outgoing email address if the outgoing email is received from an email client that is in the list of email clients that does not allow user selection of a default client email address.

14. An email server system as recited in claim 10, wherein the email service is configured to route an outgoing email to a designated recipient without the update if the outgoing email is received from an email client that is in the list of email clients that allows user selection of a default client email address.

15. An email server system as recited in claim 10, wherein the email service is configured to:

determine whether an outgoing email is received as one of an original email, a reply email, or a forwarded email;

update the outgoing email with the default outgoing email address that is associated with the user if the outgoing email is the original email;

route the outgoing email to the designated recipient without the update if the outgoing email is the forwarded email; and if the outgoing email is the reply email, then one of:
update the reply email with the default outgoing email address;
route the reply email without an update of the outgoing email address; or
update the reply email with an original email address that was used by a sender to communicate an email to the user.

16. An email server system as recited in claim 15, wherein the email service is configured to determine whether the outgoing email is the original email, the reply email, or the forwarded email based on at least one of a subject of the outgoing email, message content of the outgoing email, or a structure of a server call to receive the outgoing email.

17. A method, comprising:

maintaining, at an email server, a list of email clients that allow or do not allow a user to select a default outgoing email address for an outgoing email;

receiving the outgoing email for delivery to a designated recipient, the outgoing email identified as being from one of multiple email addresses that are associated with the user;

determining whether the outgoing email is received as an original email or as a reply email; and routing the outgoing email to the designated recipient with an update to a default outgoing email address based at least in part on the list of email clients if the outgoing email is received as the original email; or routing the outgoing email to the designated recipient without the update if the outgoing email is the reply email.

18. A method as recited in claim 17, further comprising:
receiving the outgoing email as a forwarded email; and
routing the forwarded email as an additional original email with the update of the default outgoing email address; or
routing the forwarded email as an additional reply email without the update of the default outgoing email address.

19. A method as recited in claim 17, further comprising:
maintaining the default outgoing email address at an email server, the default outgoing email address designated by the user who is associated with the multiple email addresses that are correlated at the email server.

20. A method as recited in claim 17, further comprising one of:
determining to update the outgoing email with the default outgoing email address if the outgoing email is received from an email client that does not allow user selection of a default client email address; or
determining not to update the outgoing email with the default outgoing email address if the outgoing email is received from the email client that is configured to allow user selection of the default client email address.

* * * * *